(12) United States Patent
Gensch et al.

(10) Patent No.: US 9,902,498 B2
(45) Date of Patent: Feb. 27, 2018

(54) DEVICE FOR THE ATTACHMENT OF SEATS IN PASSENGER CABINS, A SEAT TRACK, A HOLDING DEVICE, AND A METHOD

(75) Inventors: Hinnik Gensch, Hamburg (DE); Thorsten Roming, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 108 days.

(21) Appl. No.: 14/116,770

(22) PCT Filed: May 11, 2012

(86) PCT No.: PCT/EP2012/058831
§ 371 (c)(1),
(2), (4) Date: Nov. 10, 2013

(87) PCT Pub. No.: WO2012/152937
PCT Pub. Date: Nov. 15, 2012

(65) Prior Publication Data
US 2014/0077577 A1  Mar. 20, 2014

Related U.S. Application Data

(60) Provisional application No. 61/485,150, filed on May 12, 2011.

(30) Foreign Application Priority Data

May 12, 2011 (DE) .......................... 10 2011 075 771

(51) Int. Cl.
F16M 13/00 (2006.01)
B64D 11/06 (2006.01)
B60N 2/015 (2006.01)

(52) U.S. Cl.
CPC ...... *B64D 11/0696* (2013.01); *B60N 2/01575* (2013.01)

(58) Field of Classification Search
CPC .... B60N 2/085; B60N 2/0818; B60N 2/0705; B64D 11/0696
(Continued)

(56) References Cited

U.S. PATENT DOCUMENTS 2,589,922 A * 3/1952 Bowman ............ B60N 2/01541
                                                    248/502
2,736,272 A * 2/1956 Elsner .......................... 410/105
(Continued)

FOREIGN PATENT DOCUMENTS

DE         2940463      4/1980
DE      102007001806    7/2008
(Continued)

OTHER PUBLICATIONS

German Search Report, Mar. 27, 2012.
International Search Report, Apr. 9, 2013.

*Primary Examiner* — Kimberly Wood
(74) *Attorney, Agent, or Firm* — Greer, Burns & Crain, Ltd.

(57) ABSTRACT

A device for the attachment of seats in passenger cabins of aeroplanes, road coaches, ships, railways, and similar, with at least one seat track, which has at least one exterior latching section, and with at least one holding device for purposes of attaching the seat to the at least one seat track. The at least one holding device has two integrated arms to engage around the latching sections and a multiplicity of teeth to fix it in position. The teeth can be moved in the vertical direction of the seat track. A seat track thermally is coated on at least some sections with exterior latching sections. A method is disclosed for the attachment of seats in passenger cabins.

8 Claims, 8 Drawing Sheets

(58) Field of Classification Search
USPC ..... 248/424, 429, 419, 423, 430; 244/118.1, 244/118.6, 122 R See application file for complete search history.

(56) References Cited

U.S. PATENT DOCUMENTS

| | | | | |
|---|---|---|---|---|
| 3,212,457 | A | * | 10/1965 | Looker .......................... 410/105 |
| 3,241,501 | A | * | 3/1966 | Watts ............................ 410/105 |
| 3,381,927 | A | | 5/1968 | Stephen |
| 3,570,415 | A | * | 3/1971 | Drinnon ................ B64D 9/003 248/501 |
| 4,047,689 | A | * | 9/1977 | Grendahl ...................... 410/105 |
| 4,062,298 | A | * | 12/1977 | Weik .............................. 410/105 |
| 4,109,891 | A | * | 8/1978 | Grendahl ................... 248/503.1 |
| 4,291,856 | A | | 9/1981 | Urai |
| 4,449,875 | A | * | 5/1984 | Brunelle ........................ 410/80 |
| 4,493,470 | A | * | 1/1985 | Engel .......................... 248/503.1 |
| 4,771,969 | A | | 9/1988 | Dowd ........................ 244/118.6 |
| 4,811,877 | A | * | 3/1989 | Heideman ..................... 224/321 |
| 4,878,640 | A | * | 11/1989 | Fricker et al. ............ 248/297.21 |
| 5,100,092 | A | | 3/1992 | Sovis |
| 5,178,346 | A | * | 1/1993 | Beroth ...................... 244/122 R |
| 6,061,670 | A | | 5/2000 | Brand |
| 7,980,525 | B2 | * | 7/2011 | Kostin .......................... 248/429 |
| 8,474,756 | B2 | * | 7/2013 | Allain ................ B64D 11/0696 244/118.6 |
| 2005/0156095 | A1 | | 7/2005 | Vichniakov |
| 2008/0017755 | A1 | * | 1/2008 | Kennedy ............ B64D 11/0696 244/118.5 |
| 2008/0149764 | A1 | | 6/2008 | Frey |
| 2008/0197234 | A1 | | 8/2008 | Wilhelm et al. |
| 2010/0001126 | A1 | | 1/2010 | Supan et al. |
| 2011/0309195 | A1 | | 12/2011 | Bishop |

FOREIGN PATENT DOCUMENTS

| | | |
|---|---|---|
| DE | 102007004554 | 7/2008 |
| DE | 102009028534 | 2/2011 |
| DE | 102009028903 | 3/2011 |
| EP | 0926632 | 6/1999 |
| EP | 0949112 | 10/1999 |
| EP | 1544105 | 6/2005 |
| EP | 2397409 | 12/2011 |
| JP | 63049560 | 3/1988 |
| WO | 03004304 | 1/2003 |

* cited by examiner

DEVICE FOR THE ATTACHMENT OF SEATS IN PASSENGER CABINS, A SEAT TRACK, A HOLDING DEVICE, AND A METHOD

CROSS-REFERENCES TO RELATED APPLICATIONS

This application claims the benefit of the U.S. Provisional Application No. 61/485,150, filed on May 12, 2011, and of the German patent application No. 10 2011 075 771.6 filed on May 12, 2011, the entire disclosures of which are incorporated herein by way of reference.

BACKGROUND OF THE INVENTION

The invention concerns a device for the attachment of seats in passenger cabins in accordance with the preamble of claim 1, a seat track and a holding device for such a device, and also a method for the attachment of seats onto seat tracks.

Devices for the attachment of seats in aircraft cabins conventionally have seat tracks extending in longitudinal directions and holding devices guided in the seat tracks for the accommodation of the seats. Seat tracks of known art have a half-open and undercut profile, in which are designed latching sections directed inwards for purposes of positioning and fixing the holding devices. The seat tracks preferably consist of aluminium, or an aluminium alloy, and are provided with surface protection to avoid corrosion. However, as a result of the interior latching sections, or as a result of the interior castellated geometry of the seat tracks, damage regularly occurs to the surface protection, as a result of which the formation of corrosion is promoted. For purposes of avoiding corrosion it is recommended in the European patent EP 1 544 105 B1 that the seat tracks are manufactured from a composite material, wherein one section forming the head of the track and latching sections consists of titanium, and one section forming the foot of the track consists of an aluminium or magnesium alloy. While by virtue of the use of titanium in the region of the latching sections corrosion can indeed be reliably prevented, titanium is heavier and more expensive than aluminium. Moreover the installation of the seats and in particular the holding devices continues to be labour-intensive, since the holding devices, now as before, are threaded onto the seat track through the interior latching sections.

Seat tracks with exterior latching sections are, for example, shown in EP 0 926 632 B1. These seat tracks have in each case a longitudinal web with a head flange widened in the transverse direction for purposes of forming the exterior latching sections, as a result of which any threading of holding devices onto the seat track is fundamentally eliminated. What is disadvantageous, however, is the fact that the holding devices are in each case embodied from two separate halves to be connected with one another, between whose end holding sections the seat track in question and a runner-type seat frame section must in each case be simultaneously positioned in the installation procedure. An automatic mounting of the holding devices on the seat tracks is not possible.

SUMMARY OF THE INVENTION

The object of the invention is to create a device for the attachment of seats in passenger cabins, which removes the above-cited disadvantages and in particular is corrosion-resistant and easy to install. Furthermore it is the object of the invention to create a seat track and a holding device for such a device, as well as a method for the attachment of seats to seat tracks.

An inventive device for the attachment of seats in aircraft cabins has at least one seat track with at least one exterior latching section, and at least one holding device for the accommodation of the seat in question. In accordance with the invention the at least one holding device has two integrated arms to engage around the latching sections and a multiplicity of teeth to fix it in position; these arms can be traversed (moved) in the vertical direction of the seat track.

As a result of the transfer of the at least one latching section from an interior to an exterior location, good accessibility is achieved for thermal spraying methods, such as e.g. plasma or HVQF, as a result of which ceramic and highly wear-resistant protective coatings such as aluminium oxide, tungsten carbide, etc. can be applied. Thus the seat track can consist of light aluminium, and the deployment of corrosion resistant, but heavier and more expensive, materials such as titanium is not necessary. As a result of the combination of the exterior latching sections with the integrated arms the installation procedure is simplified, since any threading in of the holding devices is eliminated, and the holding devices are automatically guided along the seat track. At the same time the teeth that can be moved in the vertical direction enable an easy to install and simple translation of the holding device in question from a released position into a locked position and vice versa, so that any repositioning can be rapidly enabled.

In one example of embodiment the latching sections are open in the vertical direction. The latching sections that are open in the vertical direction enable other track-based stops for the holding devices, such as webs or similar, to be eliminated, such that in its released position the holding device in question can be traversed (moved) freely in the longitudinal direction along the seat track. Moreover the surface protection can be particularly easily applied through the recesses that are open upwards and downwards.

The latching sections preferably have a multiplicity of projections spaced apart from one another, which are formed by means of recesses introduced into a slideway surface for the accommodation of the teeth. The lateral recesses have reduced wall surfaces compared with the alternative of through-holes passing through the slideway surface in the vertical direction for the accommodation of the teeth, as a result of which fewer surfaces have to be coated.

The arms preferably have a multiplicity of hook-shaped arm sections spaced apart from one another, which can be guided through the recesses in the vertical direction. By this means the at least one holding device can be set down on the seat track at any longitudinal position. Sliding of the holding device onto the seat track from one end is not necessary; neither is a holding device opening mechanism in the region of the arms. At the same time the hook-shaped arm sections form a form-fit connection with the projections in the vertical direction.

A high level of stability can be achieved for the holding device, and the connection between holding device and seat track can be highly loaded, if one tooth is arranged in each case between two arm sections. The numbers of arm sections and teeth are determined in accordance with the anticipated loading and thus, for example, also in accordance with the seat type in question.

Installation can be further simplified if the teeth are initially spring-loaded in the direction of their released positions, so that any inadvertent latching of the holding device in question is prevented.

At least one spring is preferably supported on a sliding element for purposes of pre-loading the teeth into the released position; in a locked position of the teeth this sliding element is pressed against the slideway surface. By means of the sliding element, which can be provided with a slideway liner such as felt, the sliding movement of the holding device along the seat track is simplified, and moreover any wear-related damage of the surface protection as a result of frequent changes in position is prevented. Furthermore in the locked position a suitable slideway liner enables damping between the holding device and the seat track, i.e. the seats, as a result of which on the one hand loadings, in particular impact loadings, introduced into the seat tracks are eliminated, or are only transferred to the seats in a damped form, and on the other hand any damage of the slideway surface, or the surface protection, in the locked position is prevented.

In an alternative example of embodiment the latching sections have a multiplicity of projections designed on the rear face of the slideway surface. As a result of the rearward arrangement of the latching sections these are very well protected from inadvertent damage and contamination.

The teeth are preferably integrated in end sections of the arms that are angled inwards, i.e. in this variant, they are designed integrally, that is to say, in one piece, with the arms. By the integration of the teeth into the arms the at least one holding device is, so to speak, fully lifted during the locking procedure. No separate components are necessary for the formation of the teeth, as a result of which both the number of parts and the weight of the holding device are reduced.

In order to be able to slide the at least one holding device onto the seat track not just from one end, it is advantageous if the holding device has at least one arm that can be pivoted for purposes of opening the holding device in the region of its arms.

The projections preferably form a waveform contour and the arms correspondingly have an opposing waveform contour. The waveform profiling enables a low surface pressure during the locking procedure, since the waveform profiling enables the formation of a load transfer surface with a greater extent in the longitudinal direction than a plane load transfer surface. Furthermore the waveform profiling enables the implementation of a resolution of 1 cm and thus the implementation of a resolution<1 inch.

The holding device can have a sliding element, which in a locked position of the teeth is pressed against the slideway surface by means of an actuation element. By means of the sliding element, which can be provided with a slideway liner such as felt, the sliding movement of the holding device along the seat track is simplified, and moreover any wear-related damage of the surface protection as a result of frequent changes in position is prevented. Furthermore in the locked position a suitable slideway liner enables damping between the holding device and the seat track, i.e. the seats, as a result of which on the one hand loadings, in particular impact loadings, introduced into the seat tracks are eliminated, or are only transferred to the seats in a damped form, and on the other hand any damage of the slideway surface, or the surface protection, in the locked position is prevented.

A preferred seat track for an inventive device has exterior latching sections and has surface protection applied at least in the region of the latching sections by a thermal method. The surface protection can be embodied by thermal application as a ceramic highly wear-resistant coating such as aluminium oxide, silicon oxide, tungsten carbide or similar by means of plasma or HVQF and is thus resistant to abrasion caused by frequent changes in position of the holding devices and/or seats. Such a seat track can thus consist of a light and cost-effective aluminium or aluminium alloy, without the threat of any corrosion in normal operation.

A preferred holding device for an inventive device has at least two integrated arms, a multiplicity of teeth for purposes of fixing it in position on a seat track, an actuation element for purposes of traversing (moving) the teeth in the vertical direction of the seat track, and a sliding element to provide support on a slideway surface of the seat track. Such a holding device allows simple and rapid installation of seats on seat tracks that does not incur any damage.

In an inventive method for the attachment of seats in passenger cabins the holding device is brought into operative engagement with projections of the seat track by means of a latching movement, i.e. a movement of teeth in the vertical direction of the seat track. Such a method allows simple and rapid installation of seats on seat tracks that does not incur any damage.

Other advantageous examples of embodiment of the invention are the subject of further subsidiary claims.

BRIEF DESCRIPTION OF THE DRAWINGS

In what follows preferred examples of embodiment of the invention are elucidated in more detail with the aid of schematic representations. Here.

DETAILED DESCRIPTION OF THE PREFERRED EMBODIMENTS

Figure 1:
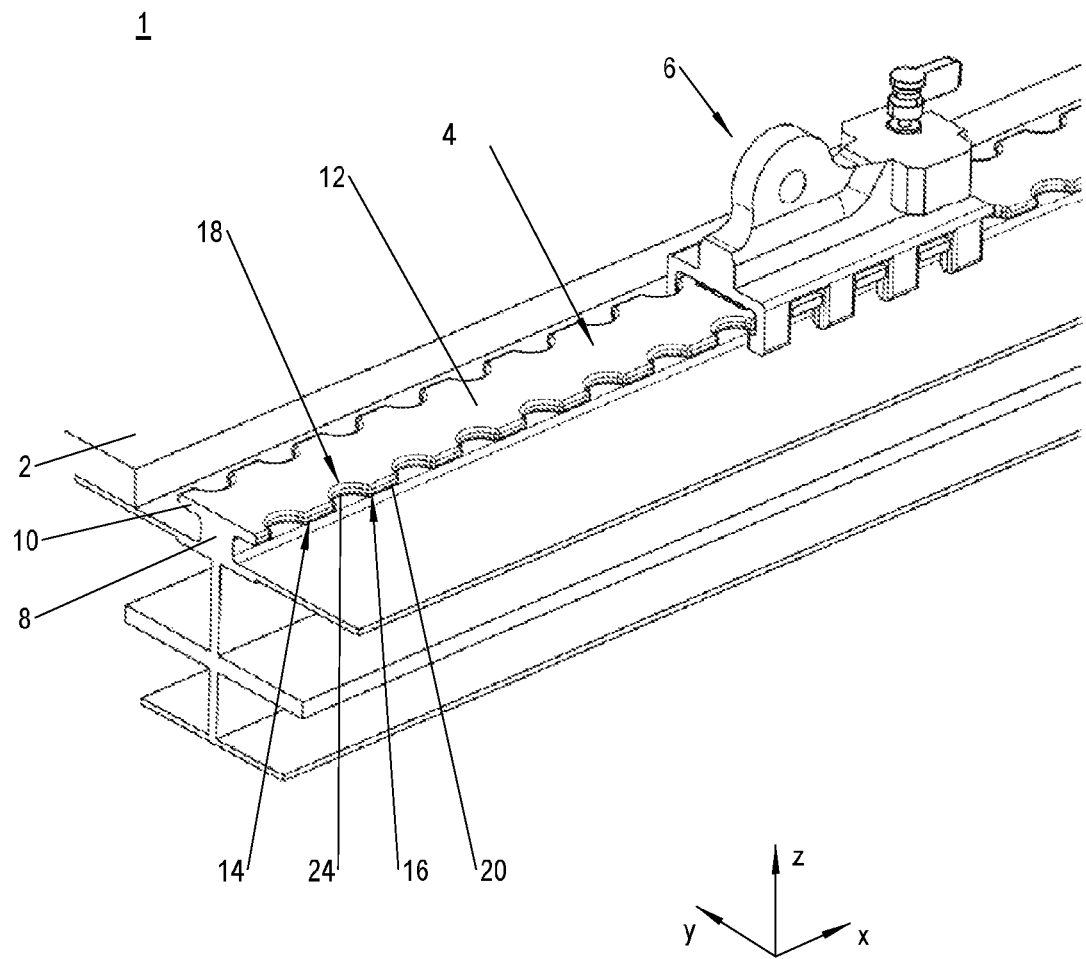
FIG. 1 shows a perspective representation of a first example of embodiment of an inventive device.

FIG. 1 shows a perspective representation of a first example of embodiment of an inventive device 1 for the attachment of seats, not represented, in passenger cabins, in particular in aircraft cabins. The device 1 has at least two seat tracks 4 running between base plates 2, and also at least one holding device 6 per seat track 4 for purposes of producing a mechanical connection between the seat track 4 and a seat, or a row of a plurality of seats.

In the interests of clarity, however, only one seat track 4 and one holding device 6 are represented. Likewise in the interests of clarity the same design elements are provided with the same reference symbols, wherein where there are a plurality of the same design elements in one figure only one element is preferentially provided with a reference symbol.

The seat track 4 preferably consists of aluminium, or an aluminium alloy, and is thermally coated with a highly wear-resistant protective coating such as aluminium oxide, silicon oxide, tungsten carbide, or similar. It extends in the longitudinal direction x of the device 1 and has a free T-shape cross-section with a web 8, the foot of which is connected to a structural section of the aircraft. The head of the web 8 has a flange 10 for the accommodation and guidance of the holding device 6, which flange extends in the transverse direction y of the device on both sides of the web 8. The flange 10 forms an exterior castellated geometry for purposes of latching the holding device 6 in question; the flange is formed in terms of two exterior latching sections on its opposing longitudinal sides, and also an exterior slideway surface 12.

The latching sections have in each case a multiplicity of projections 14, 16, which are spaced apart from one another by recesses 18 laterally introduced into the flange 10, i.e. into the slideway surface 12.

The projections 14, 16 of a latching section are regularly spaced apart from one another, and have an extent in the longitudinal direction x, which corresponds to that of a mouth opening of the recesses 18. With opposing projections of the other latching section they form in each case a projection pair and have in each case a straight longitudinal surface 20 extending between the recesses 18.

The recesses 18 open up the latching sections in the vertical direction z.

They serve in each case to accommodate one tooth 22 of the holding device 6 and pass through the flange 10 in the vertical direction z.

They preferably have in each case a concave curved surface 24 bounding the projections 14, 16.

Figure 2:
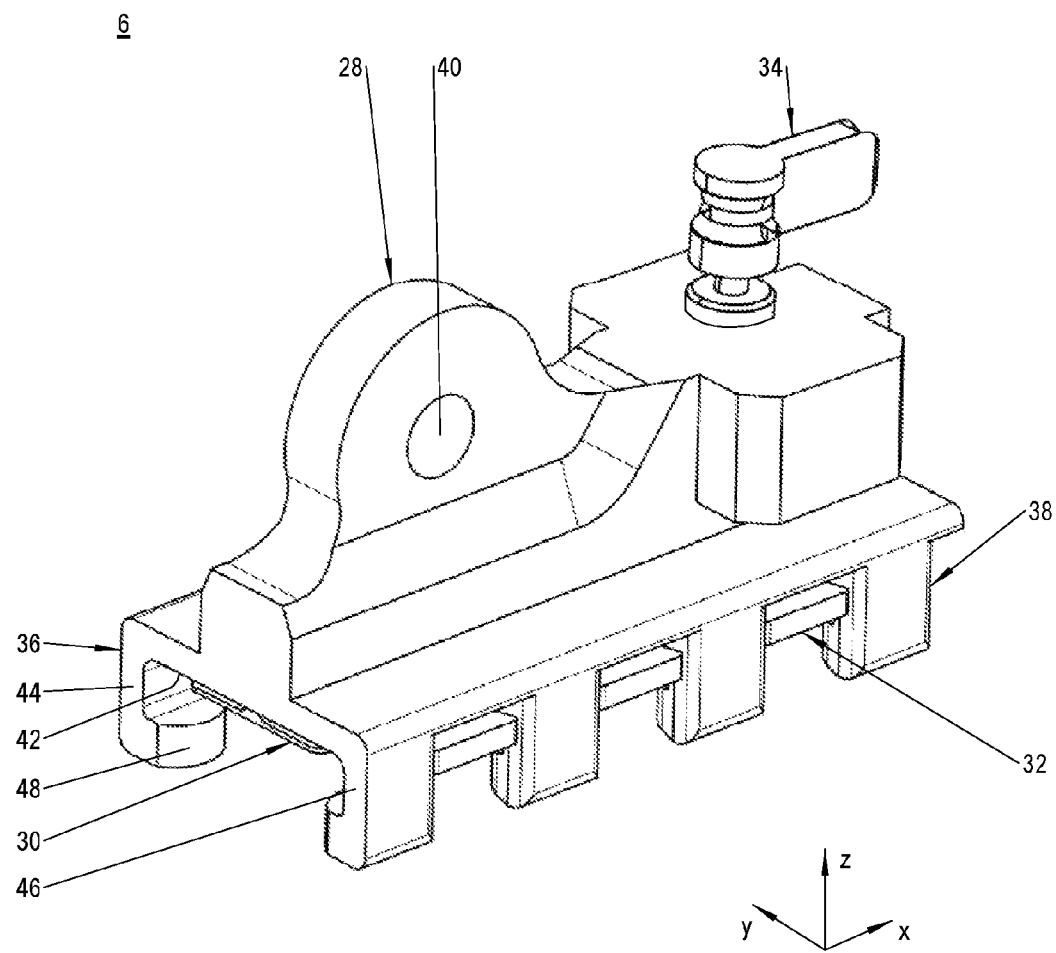
FIG. 2 shows a detail of a first holding device shown in FIG. 1.

As shown in FIG. 2, the holding device 6 has a base body 28, a sliding element 30, a locking element 32, and also an actuation element 34.

The base body 28 has two opposing arms 36, 38 to engage around the flange 10 of the seat track 4, and also an eye 40 for purposes of attaching a seat.

The arms 36, 38 are securely integrated into the base body 28, or are integrally designed with the latter. They extend downwards from a lower face 42 of the base body 28 in the vertical direction z in accordance with the representation in FIG. 2, and are embodied in the form of a comb with, in each case for example, three pairs of arm sections 44, 46 spaced apart from one another. The arm sections 44, 46 can be guided in the vertical direction z through the recesses 18, and are spaced apart from one another with a longitudinal spacing that corresponds to an extent of the teeth 20 in the longitudinal direction x. For purposes of engaging around the flange 10, i.e. the projections 14, 16, they have in each case an inwardly directed hook-shaped end section 48.

Figure 3:
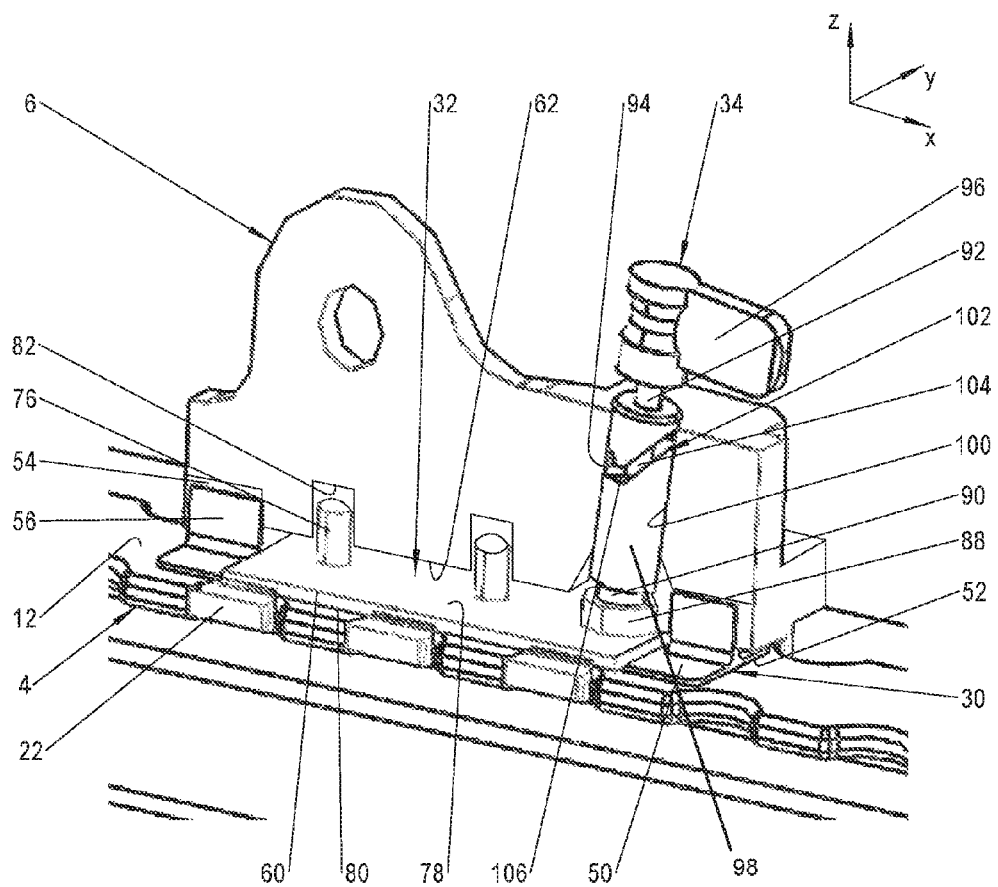
FIG. 3 shows a longitudinal section through the first holding device.

The sliding element 30 serves to support the holding device 6 on the seat track 4 and to provide a low friction sliding movement of the holding device 6 along the seat track 4. As shown in FIG. 3 it has a plate-type sliding section 50, which preferably extends over the lower face 42 of the base body 28, and on its lower face 52 facing towards the slideway surface 12 is provided with a slideway liner such as felt, not shown. It is guided in two guides 54 of the base body 28 extending in the vertical direction z, and for this purpose has two guiding sections 56 extending at right angles from the sliding section 50 in the edge region of its narrow sides. In order to prevent the sliding element 30 from falling out of the guides 54 as the holding device 6 is removed from the seat track 4, at least one of the guiding sections 56 is appropriately secured in its guide 54.

Figure 4:
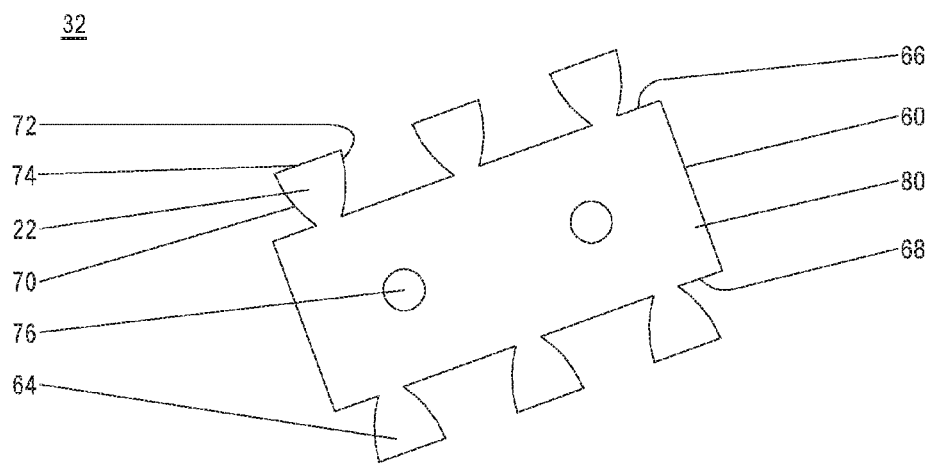
FIG. 4 shows a view from underneath of an individual element of the first holding device.

The locking element 32 is arranged between the base body 28 and the sliding element 30, and can be traversed (moved) in the vertical direction z, and thus at right angles to the seat track 4. It has a plate-type base section 60, which in a released position is accommodated in a depression 62 of the lower face 42 of the base body 28. For purposes of locking the holding device 6 the locking element 32 has, for example, six teeth 22, 64, which, as shown in FIG. 4, are arranged in three pairs, in each case with two teeth 22, 64 on opposing longitudinal sides 66, 68 of the base section 60. For purposes of enabling an operative engagement with the projections 14, 16 over a large surface area the teeth 22, 64 have in each case two convex flanking surfaces 70, 72 corresponding to the concave peripheral surfaces 24 of the recesses 18. Moreover the teeth have a straight longitudinal surface 74 connecting the flanking surfaces 70, 72 with one another. In a locked position shown in FIG. 3 the teeth 22, 64 engage in the recesses 18 between the projections 14, 16 of the seat track 4, as a result of which the holding device 6 is latched in a form fit with the seat track 4.

For purposes of guiding the locking element 32 in the vertical direction z the latter has two pin-type guiding sections arranged one behind another in the longitudinal direction x and designed as pockets 76, which extend at right-angles from an upper face 78 of the base section 60, and, as shown in FIG. 4, are open to the opposing face 80. The pockets or guiding sections 76 are in each case guided in a recess 82 of the base body 28 in the form of a blind hole introduced in the floor region of the depression 62, and serve moreover to accommodate a spring 84 that pre-loads the locking element 32 into a released position.

Figure 5:
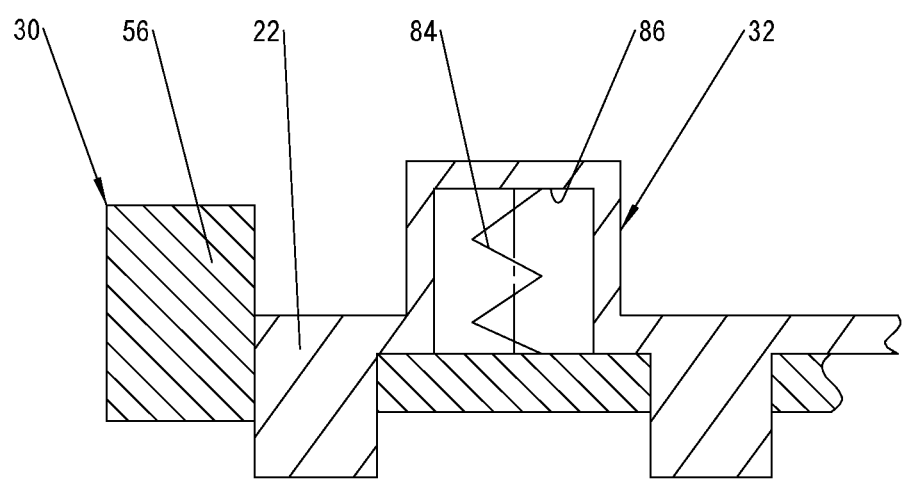
FIG. 5 shows a scrap section in the longitudinal direction through the first holding device.
Figure 5:
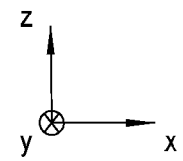

As shown in FIG. 5, the springs 84 are compressed between the sliding element 30 and the base 86 of the pockets 76, and in the released position thus cause the locking element 32 to lift from the seat track 4 in the vertical direction z.

For purposes of producing an operative connection with the actuation element 34 to translate the locking element 32, i.e. the holding device 6, into a locked position, the locking element 32, as shown in FIG. 3, has on its upper face 80 a seating 88, which forms a bearing shell for a ball 90 of the actuation element 34.

The actuation element 34 has a shaft 92, which can be rotated about an axis of rotation set at an angle inclined to the vertical direction z, and a laterally extending pin 94. The shaft 92 is located with one end section in contact with the ball 90 and on its opposing end section is provided with a handle 96 for purposes of rotating or pivoting the shaft; the handle is detachably connected with the shaft 92 and after the installation of the holding device is removed.

The axis of rotation can, however, also be aligned without any inclination to the vertical direction z. Moreover the handle 96 can be a rotary knob, or can be replaced by a tool seating such as a hexagon socket profile, or similar. Furthermore the handle 96 can be a lever, or similar, which is initially spring-loaded into a secure position.

For purposes of guiding the shaft 92 in the base body 28 the actuation element 34 has a cylinder 98, which is inserted in a bore 100 of the base body 28 inclined at an angle to the vertical direction z, and has a slotted sliding link 102 to accommodate the pin 94.

The slotted sliding link 102 passes through a wall section of the cylinder 98 and has a slotted link section 104 set at an angle to the axis of rotation of the shaft 92, and also two link sections 106 extending in the circumferential direction of the cylinder 98, of which only one is visible in the perspective view shown. For purposes of arresting the locking element 32 in the locked position the visible end section is provided at its end with a locking section, not numbered.

For purposes of positioning the seats on the seat tracks 4 the holding devices in the region of their eyes 40 are connected in a first step to the seats, or to the seats composed into rows.

In a second step the seats are then positioned on the seat tracks 4, wherein the holding devices 6 are set down on the seat tracks 4 by means of a downward movement in the vertical direction z. At the same time the arm sections 44, 46 are positioned above the recesses 18 and the teeth 22, 64 are positioned above the projections 14, 16, and the holding devices are then lowered until the sliding element 30 with its slideway lining is lying on the slideway surface 12. The locking element 34 is lifted by means of the springs 84 and translated into its released position.

In a third step the holding devices 6 are now moved in the longitudinal direction of the seat tracks 4 into their required positions, wherein the arm sections 44, 46 with their hook-shaped end sections engage around the projections 14, 16 and the teeth 22, 64 are arranged above the recesses 18.

After the translation into the required position the handle 96 is actuated in a fourth step, and the locking element 32 is pressed, counter to the pre-load force of the springs 84, downwards against the sliding element 30, as a result of which its teeth 22, 64 move into the recesses 18 between the projections 14, 16. The teeth 22, 64 are hereby pressed, so to speak, into the latching sections 14, 16, 18. The handle 96 is actuated for as long as required until the pin 94 has been fully guided along the slotted sliding link 102 and accommodated in the locking section. The holding devices 6 are now fixed in position in the longitudinal direction x, and in the transverse direction y by the form fit between the teeth 22, 64 and the projections 14, 16, and in the vertical direction z by the form fit between the arm sections 44, 46 and the projections 14, 16.

For purposes of translating the holding devices 6 back into their released positions and thus releasing the lock the handle 96 is turned in the opposite direction and as a result of the spring pre-load the locking element 32 translates automatically out of a locked position into its released position. The holding device 6 can now once again be moved in the longitudinal direction along the seat track 4, and, by positioning the arm sections 44, 46 in the recesses 18, can be removed from the seat track 4.

In FIGS. 6 to 9 is shown a second example of embodiment of the inventive device 1 for the attachment of seats, preferably in aircraft cabins.

The device 1 has at least two seat tracks 4 running between base plates 2, and also at least one holding device 6 per seat track 4 for purposes of producing a mechanical connection between the seat track and a seat, or a row made up from a plurality of seats. In the interests of clarity, however, only one seat track 4 and one holding device 6 are represented.

Figure 6:
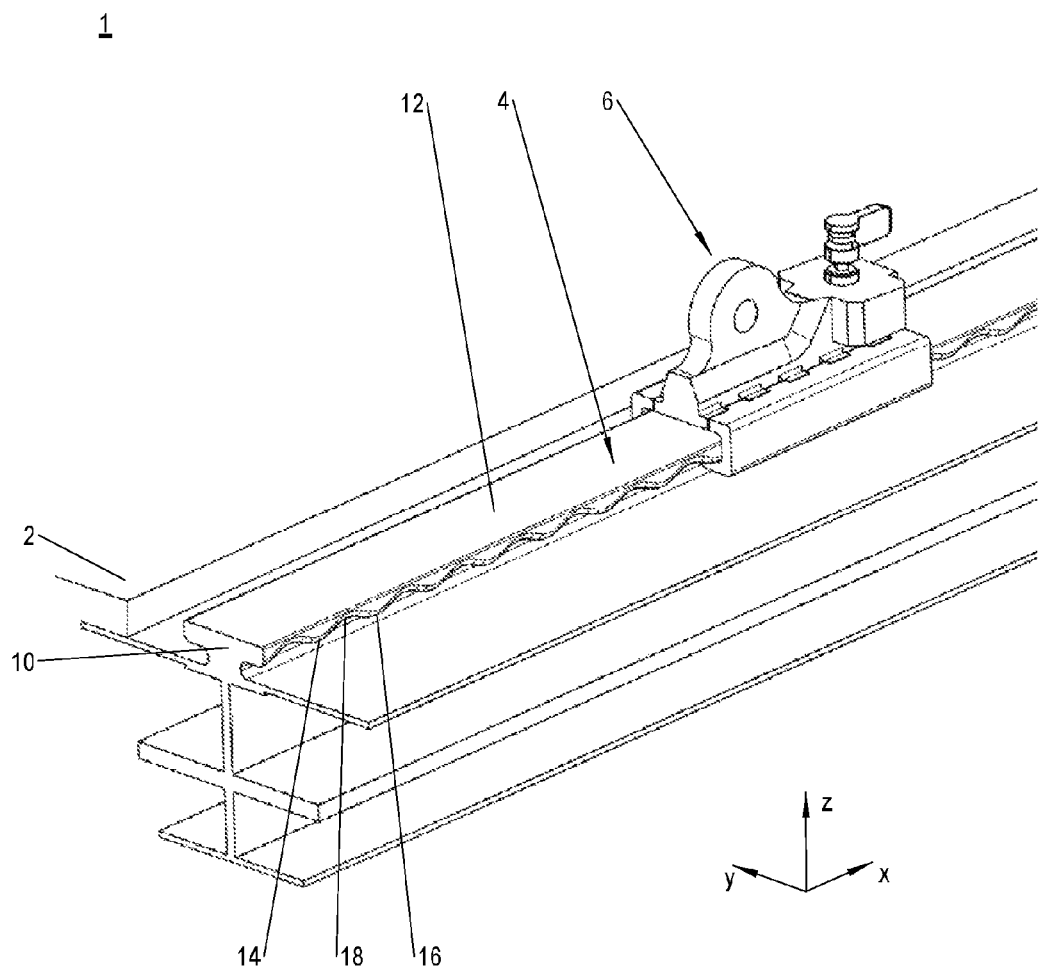
FIG. 6 shows a perspective representation of a second example of embodiment of the inventive device.

The seat track 4 has an exterior castellated geometry, which in accordance with FIG. 6, in contrast to the first example of embodiment in FIGS. 1 to 5, is formed from two exterior latching sections, which are arranged on the rear face of a flange-based slideway surface 12. The latching sections have in each case a waveform profile with a multiplicity of convex projections 14, 16, or wave peaks, and also a multiplicity of concave recesses 18, or wave troughs.

Figure 7:
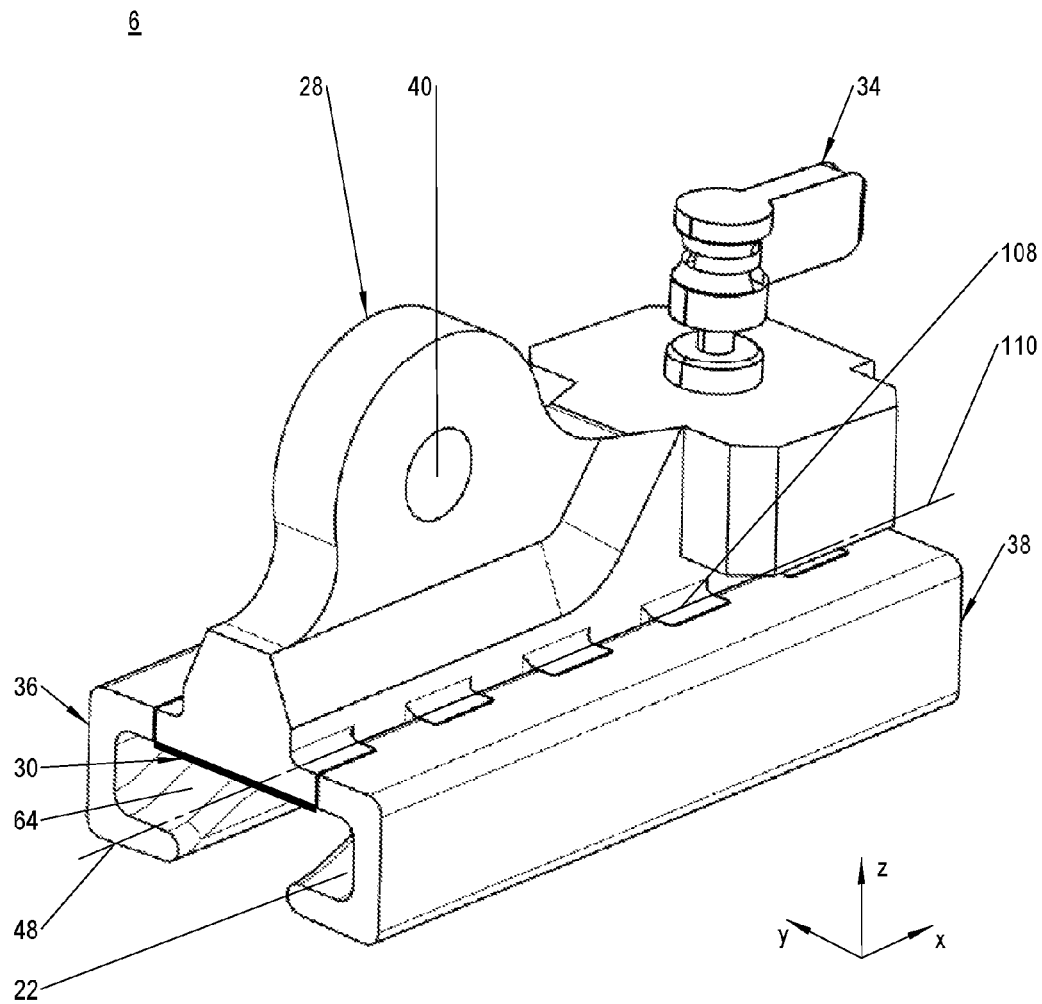
FIG. 7 shows a detail of a second holding device shown in FIG. 6.
Figure 8:
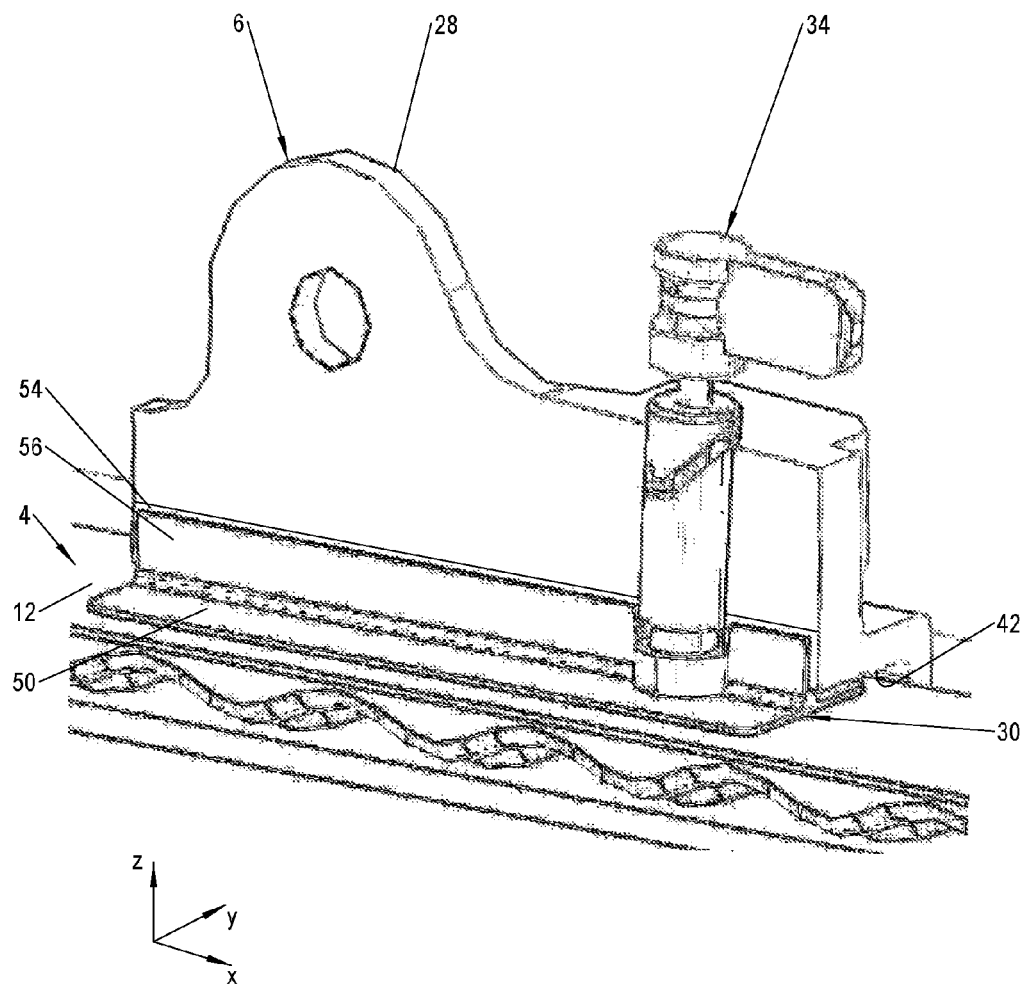
FIG. 8 shows a longitudinal section through the second holding device.

As shown in FIGS. 7 and 8, the holding device 6 has a base body 28 with two integrated arms 36, 38, a sliding element 30, teeth 22, 64, and an actuation element 34.

In contrast to the first example of embodiment, the arms 36, 38 are closed in the longitudinal direction x and are loosely integrated with the base body 28, i.e. are mounted on the latter in an articulated manner. The arms 36, 38 are in each case connected by means of a hinge 108 to the base body 28, and can be pivoted about a pivot axis 110 defined by the hinge 108 and extending in the longitudinal direction x. The arms 36, 38 are designed as U-profiles and have in each case an inwardly directed end section 48 to engage around the flange 10 of the seat track 4.

In contrast to the first example of embodiment the teeth 22, 64 are integrated into the end sections 48 and form an opposing waveform contour to the respective waveform contour 14, 16, 18 of the seat track 4. Thus the provision of a separate locking element 32 is not necessary. In particular the waveform profile is designed such that the seats can be connected to the seat tracks 4 at a latching separation distance of 1 cm behind one another in the longitudinal direction x.

In contrast to the first example of embodiment in a set-down state on the seat track 4 the sliding element 30 lies directly against the lower face 42 of the base body 28 in accordance with FIG. 8. It has a plate-type sliding section 50 and a guiding section 56 extending axially and vertically, by means of which it is guided such that it can move in a guide 54 of the base body 28 extending in the vertical direction z. In order to prevent the sliding element 30 from falling out of the guides 54 as the holding device 6 is removed from the seat track 4, at least one of the guiding sections 56 is appropriately secured in its guide 54.

The actuation element 34 is embodied in a manner that is unmodified from that of the actuation element 34 in FIGS. 1 to 5, so that reference is made to the above descriptions.

For purposes of positioning of seats on the seat tracks 4 the holding devices in the region of their eyes 40 are connected in a first step to the seats, or to the rows of seats.

In a second step the arms 36, 38 are then pivoted upwards about their pivot axes 110 and in this manner the holding device 6 is opened up. The holding devices 6 are now located in a released position.

In a third step the open holding devices 6 are then lowered in the vertical direction z downwards onto the seat tracks 4 until the holding devices 6, by means of their sliding elements 30, i.e. with their slideway linings, are supported on the slideway surfaces 12. The holding devices 6 and thus the seats can now be moved in the longitudinal direction x along the seat tracks 4.

After that the holding devices 6 are initially positioned in a fourth step. For this purpose the arms 36, 38 are pivoted back into position, and the holding devices 6 are thus closed. The opposing contours of the holding devices 6 are located in engagement with the waveform contours of the latching sections, subject to clearances, so that no movement of the holding devices 6 is possible in the longitudinal direction x.

Figure 9:
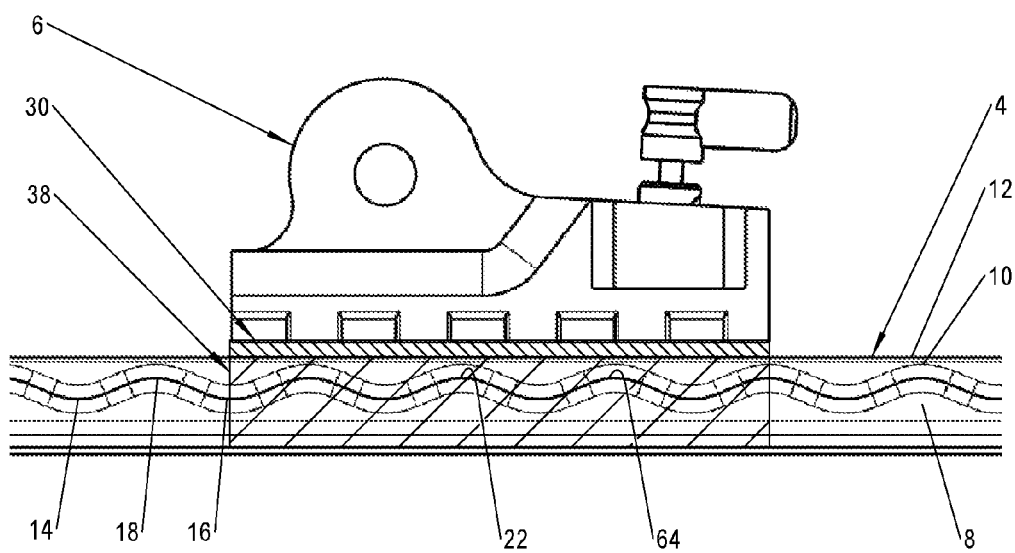
FIG. 9 shows a functional sketch of the second example of embodiment of the device from FIG. 6.
Figure 9:
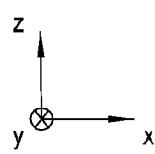

The holding devices 6 in a fifth step are then translated into their locked position. The actuation element 34 in question is actuated and the sliding element 30 is pressed against the slideway surface 12, as a result of which the base body 28 is lifted from the seat track 4 and the opposing waveform contour of the end sections 48 is brought into engagement with the waveform contour of the seat track 4 in a form fit with zero tolerances. Here the teeth 22, 64 are, so to speak, pulled into the latching sections 14, 16, 18. Now, as shown in FIG. 9, the holding devices 6 are fixed in position in the longitudinal direction x, the transverse direction y, and the vertical direction z by means of the zero clearance form fit between the waveform contours and the opposing contours.

For purposes of translating the holding devices 6 back into the released positions and thus releasing the lock the handle 96 is turned in the opposite direction and by this means the holding devices 6 are lowered. The zero clearance form fit is released and the arms 36, 38 can be pivoted. The holding devices 6 are opened up and can be lifted off the seat tracks 4 or can be moved in the longitudinal direction x along the latter.

Disclosed are a device for the attachment of seats in passenger cabins of aeroplanes, road coaches, ships, railways, and similar, with at least one seat track, which has at least one exterior latching section, and with at least one holding device for purposes of attaching the seat to the at least one seat track, wherein the at least one holding device has two integrated arms to engage around the latching sections and a multiplicity of teeth to fix it in position, which teeth can be moved in the vertical direction of the seat track; a seat track thermally coated on at least some sections with exterior latching sections; a holding device for use in such a device with integrated arms, and a method for the attachment of seats in passenger cabins.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Device
2 Base plates
4 Seat track
6 Holding device
8 Web
10 Flange
12 Slideway surface
14 Projection
16 Projection
18 Recess
20 Longitudinal surface
22 Tooth
24 Curved surface
28 Base body
30 Sliding element
32 Locking element
34 Actuation element
36 Arm
38 Arm
40 Eye
42 Lower face
44 Arm section
46 Arm section
48 End section
50 Sliding section
52 Lower face
54 Guide
56 Guiding section
60 Base section
62 Depression
64 Tooth
66 Longitudinal side
68 Longitudinal side
70 Flanking surface
72 Flanking surface
74 Longitudinal surface
76 Pocket
78 Upper face
80 Opposing face
82 Bore
84 Spring
86 Base
88 Seating
90 Ball
92 Shaft
94 Pin
96 Handle
98 Cylinder
100 Bore
102 Sliding link
104 Link section
106 Link section
108 Hinge
110 Pivot shaft
x Longitudinal direction
z Vertical direction
Y Transverse direction

The invention claimed is:

1. A device for the attachment of seats in aircraft cabins, with at least one seat track, which has at least one first exterior latching section and at least one second exterior latching section, and with at least one holding device for the attachment of a seat to the at least one seat track, comprising:
the at least one holding device having two integrated arms being arranged opposite to each other, wherein each of the integrated arms has a multiplicity of hook-shaped arm sections to engage around the at least one first exterior latching section and the at least one second exterior latching section and a locking element having a plate-type base section and a multiplicity of teeth to fix the holding device in position, wherein the multiplicity of teeth are traversable relative to the two integrated arms in a vertical direction of the seat track,
wherein the at least one first exterior latching section and the at least one second exterior latching section each have a multiplicity of projections and,
wherein the at least one first exterior latching section and the at least one second exterior latching section extend in a longitudinal direction of the seat track and are arranged opposite to each other;
wherein the multiplicity of projections of the at least one first exterior latching section and the multiplicity of projections of the at least one second exterior latching section are orientated away from each other and
wherein the multiplicity of teeth are engageable in recesses between the projections of the at least one first exterior latching section and the at least one second exterior latching section to latch the at least one holding device in a form fit with the at least one seat track.

2. The device in accordance with claim 1, wherein the at least one first exterior latching section and the at least one second exterior latching section are open in the vertical direction.

3. The device in accordance with claim 1, wherein the hook-shaped arm sections are spaced apart from one another and can be guided through recesses in the vertical direction.

4. The device in accordance with claim 3, wherein one tooth of the multiplicity of teeth is arranged between two arm sections.

5. The device in accordance with claim 1, wherein locking element is initially spring-loaded in a direction of a released position.

6. The device in accordance with claim 5, wherein at least one spring is supported on a sliding element for purposes of the spring loading of the locking element in a direction of the released position, which sliding element in a locked position is pressed against a slideway surface.

7. The device in accordance with claim 1, wherein the teeth are in inwardly angled end sections of the arms.

8. The device in accordance with claim 1, wherein the holding device has a sliding element, which in a locked position is pressed by means of an actuation element against a slideway surface.

* * * * *